United States Patent [19]

Detweiler

[11] 4,286,433
[45] Sep. 1, 1981

[54] CONTROL SYSTEM FOR TURBOCHARGER

[75] Inventor: Charles A. Detweiler, Durand, Mich.

[73] Assignee: Schmelzer Corporation, Durand, Mich.

[21] Appl. No.: 83,860

[22] Filed: Oct. 11, 1979

[51] Int. Cl.³ ............................................. F02B 37/00
[52] U.S. Cl. ......................................................... 60/602
[58] Field of Search .................. 60/600, 601, 602, 603

[56] References Cited

U.S. PATENT DOCUMENTS

| | | | |
|---|---|---|---|
| 1,476,418 | 12/1923 | Rice | 60/602 |
| 2,462,097 | 2/1949 | Heinz et al. | 60/602 X |
| 2,901,885 | 9/1959 | Reggio | 60/603 |
| 4,203,296 | 5/1980 | Tanaka et al. | 60/602 |

FOREIGN PATENT DOCUMENTS 2823067 12/1978 Fed. Rep. of Germany ............. 60/600

Primary Examiner—Michael Koczo, Jr.
Attorney, Agent, or Firm—Fisher, Gerhardt, Crampton & Groh

[57] ABSTRACT

A control system where the turbocharger of an internal combustion engine including a compressor and a turbine driven by exhaust gasses from the internal combustion engine in which exhaust gasses are bypassed to limit the speed of the turbine in proportion to the pressure of the compressor outlet above a predetermined absolute pressure which is determined by an aneroid control member.

18 Claims, 4 Drawing Figures

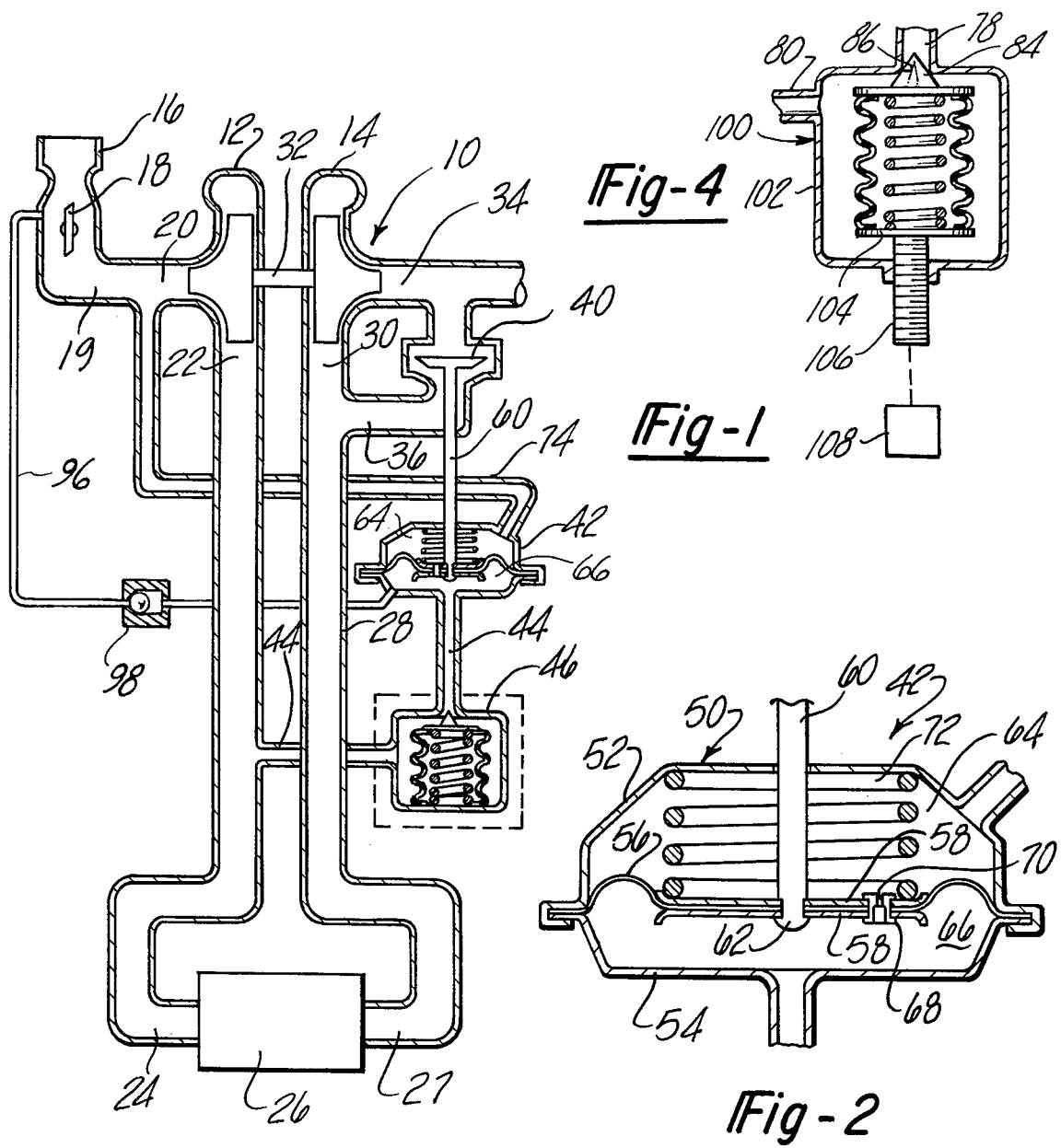

CONTROL SYSTEM FOR TURBOCHARGER

This invention relates generally to exhaust driven turbochargers for internal combustion engines and in particular to a waste gate control arrangement for regulating exhaust gasses delivered to drive the turbocharger.

The purpose of waste gate controls in turbocharger systems is to limit the maximum manifold pressure by limiting the maximum turbine speed which is being driven by exhaust gasses from the internal combustion engine. In many conventional automotive systems, the waste gate valve which serves to bypass exhaust gasses to limit the speed of the turbine is operated by a diaphragm assembly sensing the differential in pressure between the outlet of the compressor which is delivering air to the intake manifold and atmospheric or ambient pressure. This makes the intake manifold pressure of the engine limited to a constant differential above atmospheric pressure. With such arrangements the power output of the internal combustion engine can vary substantially because the intake manifold pressure can vary as much as five inches of mercury for an automobile driven at sea level and one driven at higher altitudes. Even varying barometric pressure results in different performance of the same engine on different days depending on weather conditions.

It is an object of the present invention to provide an improved turbocharger control mechanism in which the speed of the turbocharger is so controlled that the intake manifold pressure is regulated to a constant differential above a predetermined absolute pressure independently of barometric pressure.

Another object of the invention is to provide a turbocharger control operated by a fluid pressure motor so arranged that fluid leakage is transported back to the intake of the system.

Still another object of the invention is to provide a turbocharger control mechanism and applying a relatively small aneroid used to regulate a motor for moving a waste gate valve.

The objects of the invention are accomplished by an arrangement of a turbocharger including a compressor for delivering fuel-air mixture at a positive pressure to the intake manifold of an internal combustion engine turbine driven by exhaust gases from the internal combustion engine. A bypass passage is provided around the turbine which is under the control of a waste gate valve movable between a closed position wherein all exhaust gases pass through the turbine and an opening position in which some of the gases bypass the turbine. A motor is provided for moving the waste gate valve between open and closed positions and includes a movable wall supported in a housing connected to move the waste gate valve. The movable wall forms chambers communicating through a control unit with a point in the system between the outlet of the compressor and the intake manifold of the internal combustion engine. The controller includes an aneroid element which can be evacuated or charged with some gas at a fixed pressure and sealed. If gas filled, the system becomes temperature and pressure sensitive, but if evacuated, is pressure sensitive only. In either event the controller is responsive to the pressure at the intake manifold to move the control valve to admit manifold pressure to actuate the motor and thereby move the waste valve toward an open position diminishing the flow of exhaust gases in a turbine. This diminishes the speed of the turbine therefore the output of the compressor and makes the output of the compressor responsive to a differential in pressure above a preselected absolute pressure established by the aneroid element.

These and other objects of the invention will become apparent from the following description and from the drawings in which:

FIG. 1 is a schematic representation of a turbocharger system for an internal combustion engine embodying a waste gate control of the present invention;

FIG. 2 is a cross-sectional view of a control motor used in the system;

FIG. 3 is a cross-sectional view of a control assembly used to regulate the control motor and therefore the waste gate control; and FIG. 4 is a modification of the control assembly seen in FIG. 3.

Referring to the drawings the waste gate control of the present invention is used with a turbocharger assembly 10 incorporating a compressor 12 and a turbine 14. Ambient air passes through a carburetor 16, through an open throttle valve 18 and carburator plemnum 19 to the inlet side 20 of the compressor 12. Air from the compressor 12 is discharged at the outlet 22 to the intake manifold 24 of an internal combustion engine indicated at 26. Exhaust gases from the engine 26 are discharged through an exhaust manifold 27 and a connecting conduit 28 into the inlet 30 of the turbine 14 to rotate the latter. The turbine 14 is connected directly to the compressor 12 by a shaft 32. As a consequence the engine exhaust gases flowing from the internal combustion engine 26 and through the turbine 14 serve to drive the compressor 12. The exhaust gases from the turbine 14 are vented to the atmosphere through a suitable exhaust system connected to the turbine outlet 34.

A waste gate control is formed by a bypass conduit 36 which places the turbine inlet 30 in communication with the turbine outlet 34. A waste gate valve 40 is provided in the bypass conduit 36. When the waste gate valve 40 is closed, exhaust gases from the engine 26 all pass through the turbine 14 and the compressor is driven at its maximum speed. When the waste gate valve 40 is fully open, less of the exhaust gases are available for operation of the turbine 14 because of their flow through the bypass conduit 36 and as a consequence speed of the turbine 14 and the output of the compressor 12 is reduced.

The opening and closing of the waste gate valve 40 is regulated by a servomotor 42 which is actuated by pressure available in the conduit 44 between the compressor outlet 22 and the intake manifold 24 of the internal combustion engine 26. Pressure made available to the servomotor 42 is under the control of a pressure sensitive control assembly 46 disposed in a passage placing the conduit 44 in communication with the servomotor.

Referring now to FIG. 2, the servomotor 42 includes a housing 50 formed by a pair of cup-shaped housing members 52 and 54. The housing members 52 and 54 clamp a diaphragm 56 at its outer annular periphery. The diaphragm 56 has a pair of backing plates 58 at its opposite sides which are held together by an output rod 60 passing through the backing plates 58 and riveted thereto at the head 62. The diaphragm 56 forms a pair of chambers 64 and 66 at its opposite sides and pressure acting on the diaphragm moves the output rod 60 which is connected to the waste gate valve 40 to move the latter between open and closed positions.

The diaphragm 56 also includes a bleed element 68 which has a restricted passage 70 to place the chamber 64 and 66 in continuous but restricted communication with each other for a purpose to be described later. A spring 72 biases the diaphragm assembly 56 downwardly as viewed in FIG. 2 to urge valve 40 to a closed position.

The servomotor 42 is arranged so that the chamber 64 is maintained in communication with the compressor inlet 20 by way of a conduit 74 and the chamber 66 is maintained in communication with the control assembly 46 by way of the passage 44.

The control assembly 46 is shown in FIG. 3 and includes a housing 76 having a pair of ports 78 and 80 communicating, respectively, with the servomotor 42 and with the conduit 44 between the compressor and intake manifold 24.

The control assembly 46 incorporates an aneroid member in the form of a metal bellows 82 having one end fastened to the interior of the housing 76 and the other end provided with a conical valve closure element 84 adapted to move into and out of engagement with an annular valve seat 86 surrounding the entrance into the port 78. The interior of the bellows 82 is evacuated and forms a constant pressure chamber 87 containing a coil spring 88 which biases the bellows 82 to its fully extended position in which the valve element 84 is in engagement with the valve seat 86. The exterior of the bellows 82 and the interior of the housing 76 form a chamber 90 which is subjected to the pressure at the intake manifold 24 of the engine 26. When the pressure in the chamber 90 exceeds some predetermined minimum as determined by the resiliency of the bellows 82, the pressure in chamber 87 and the force of spring 88, the bellows 82 is collapsed against the action of spring 88 and moves the valve element 84 out of engagement with the valve seat 86.

The chamber 87 of bellows 82 can be evacuated or it can contain a gas at some preselected pressure and the spring 88 is calibrated so that a predetermined pressure at the intake manifold 24 is required to cause movement of the valve element 84. This insures that the valve element 84 is moved in response to a differential pressure in relation to an absolute pressure rather than to an ambient pressure. By having the bellows contain a gas it also becomes responsive to temperature. As the gases in chamber 87 are heated, the valve 84, 86 tends to move toward a closed position whereas an evacuated chamber 87 will cause the unit to operate independently of temperature.

As the internal combustion engine 26 operates, exhaust gases are delivered to the turbine 14 to drive the compressor 12 and the output pressure of the compressor is made available in the chamber 90 to act on the bellows 82 to open valve 84,86. The greater the positive pressure at the intake manifold 24 the greater the movement of the valve element 84 from its seat 86 and consequently the greater the delivery of fluid pressure to chamber 66 in the servomotor 42.

The pressure differential across the diaphragm 56 is a function of the effective flow areas of the valve 84, 86 and the bleed opening 70 through the diaphragm 56. As the flow through the control assembly 46 increases, the pressure differential across the diaphragm 56 increases causing the diaphragm 56 to move against its return spring 72 to open the waste gate valve 40 and permit exhaust gases to be bypassed around the turbine 14. This reduces the speed of the turbine 14 and consequently reduces the output of the compressor 12 to diminish the pressure in the control assembly 46 and permit the waste gate control valve 40 return toward a closed position to again increase the exhaust gases flowing through the turbine 14. The spring 72 need not be carefully calibrated and is selected so that the pressure required to move the diaphragm 56 and therefore valve 40 is less than maximum pressure at intake manifold 24. This insures that the valve 40 is controlled by the aneroid actuated valve 84, 86 rather than the return spring 72.

The conduit 74 placing the chamber 64 in communication with the compressor inlet 20 forms a flow path back to inlet manifold 24 for the fuel-air mixture in the servomotor 42 in the event that the diaphragm 56 should rupture or leak. This avoids undesirable or possibly dangerous fuel-air emissions. Also, the carburetor plenum 19 between the throttle valve 18 and the compressor inlet 20 is always under less than atmospheric pressure when the engine 26 is operating. This makes it unnecessary to provide a fluid tight seal around the output rod 60 of the servomotor 42 since any leakage that occurs in this area will be from the exterior of housing 50 to chamber 64.

Referring to FIG. 1, the chamber 66 can be placed in communication with the carburetor 16 at a point upstream of the throttle valve 18 by way of passage 96 provided with a one-way check valve 98. With such an arrangement and at very low engine speeds, for example when the engine is started and is not subjected to loads, valve 84, 86 will be closed and the vacuum in the conduit 74 is made available in the chamber 64. The spring 72 can be selected to apply only a small return force so that the output rod 60 and therefore the waste gate valve 40 is moved to a partially open position when the engine is first started. This permits exhaust gases to partially bypass the turbine 14 and reduces the turbocharging at a time when it is not required for vehicle operation. As soon as pressure at the compressor inlet increases, as would occur when engine speed is increased or the engine is subjected to load, the waste gate valve 40 is moved to its closed position to insure that all of the exhaust gases pass through the turbine 14.

Since the operation of the aneroid or bellows unit is simply for the purpose of moving the valve element 84 it can be made small because of the small valve moving forces that are required.

Referring now to FIG. 4, a control assembly 100 is shown which is a modification of the control assembly 46 seen at FIG. 3. The control assembly 100 includes a housing 102 which like the control assembly 46 has ports 78 and 80 communicating, respectively, with servomotor 42 and with the conduit 44 between the compressor and the intake manifold 24. In this instance bellows 82 has one end fastened to a plate 104 rotatably mounted on the end of an adjustment screw 106 threadably engaged in an end wall of the housing 102. The control assembly 100 operates the same as the control assembly 46 except that rotation of the adjustment screw 106 provides a means of selecting the pressure at which the valve 84 will lift off of its seat 86. The screw 106 can be connected to a temperature sensitive device 108 so that maximum turbocharger pressure, which occurs when the valve 84, 86 is closed, is related to temperature.

The opening 70 in the bleed element 68 permits the waste gate valve 40 to move to a closed position in the event that the valve element 84 should suddenly be moved to a closed position. Such a condition might occur where the throttle 18 is suddenly closed. Unless pressure in the chamber 66 is relieved the waste gate valve 40 would remain in its open position. By employing the bleed element 68, pressure in the chamber 66 can bleed to the chamber 64 and through the conduit through the intake of the compressor and permit the waste gate valve 40 to return to its closed position.

A control system for turbochargers for internal combustion engines has been provided wherein a turbine driven by exhaust gases from the internal combustion engine drives a compressor to deliver a pressurized fuel-air mixture to the intake manifold of the internal combustion engine. The exhaust gases driving the turbine are under the control of a waste gate valve which is moved between open and closed positions to control the volume of exhaust gases passing through the turbine and therefore its speed. The amount of gases bypassed are dependent on actuation of a motor regulated by a controller incorporating an aneroid element which is maintained at a predetermined absolute pressure. As a result, the waste gate valve is moved to an open position in proportion to the differential pressure between the fuel air mixture at the intake manifold of the engine and the predetermined absolute pressure resulting in regulation independently of atmospheric pressure.

The embodiments of the invention in which an exclusive property or privilege is claimed are defined as follows:

1. A control system for a turbocharger having a compressor driven by a turbine comprising; valve means movable to alter the volume of exhaust gasses supplied to drive the turbine to control pressure of fluid discharge from the compressor, motor means to move the valve means between open and closed positions, control means disposed in a position to regulate communication between said outlet of said compressor and said motor means including a regulating valve movable between open and closed positions, means biasing said regulating valve to a closed position in response to a predetermined absolute pressure and to an open position in response to pressure from said compressor outlet greater than said predetermined absolute pressure to open said valve means and alter the speed of said turbine.

2. The combination of claim 1 wherein said motor is movable in response to a pressure at the outlet of said compressor above a predetermined absolute pressure.

3. The combination of claim 1 wherein said motor includes a movable wall having one side subjected to pressure above a predetermined absolute value and the other side subjected to pressure at the inlet of said compressor.

4. The combination of claim 3 wherein said movable wall has a restricted passage in said movable wall to place opposite sides thereof in communication with each other.

5. The combination of claim 1 wherein said motor includes a movable wall biased in one direction by a spring exerting a force substantially equal to the force acting in opposition to said spring as provided by the minimum pressure at the outlet of said compressor and acting on said movable wall.

6. The combination of claim 1 wherein said valve means is disposed in a closed position when the pressure at said compressor outlet is at a minimum with the engine operating.

7. The combination of claim 1 wherein said control means includes a housing, a bellows having one end fixed to a wall of said housing and forming a chamber within said bellows and a chamber exterior of said bellows, the chamber within said bellows being evacuated to afford a fixed absolute pressure.

8. The combination of claim 7 wherein the chamber at the interior of said bellows incorporates a spring urging said bellows to its extended position and wherein the pressure in said chamber exterior of said bellows acts on the later in opposition to said spring.

9. The combination of claim 8 wherein one end of said bellows is fixed at said housing and the other end of said bellows is provided with a valve closure element cooperating with a valve seat forming an opening between said housing and said motor.

10. The combination of claim 1 wherein said control member includes a housing, a bellows disposed in said housing and forming a chamber within said bellows, the chamber within said bellows being sealed with a fixed quantity of gas to afford a predetermined absolute pressure at a given temperature and wherein the pressure in said chamber increases with an increase in temperature.

11. The combination of claim 1 wherein said control means includes a housing, an adjusting member supported in a wall of said housing, a bellows having one end engageable with said adjusting member and the other end of said bellows provided with said regulating valve, said bellows forming a chamber within said bellows at a predetermined absolute pressure and a chamber exterior of said bellows communicating with said outlet of said compressor, said adjusting member being movable to select the opening pressure of said regulating valve.

12. The combination of claim 11 wherein said adjusting member is movable in response to changes in temperature.

13. A control system for a turbocharger for an internal combustion engine including a compressor for delivering fuel-air mixture at a positive pressure from a carburetor to the intake manifold of an internal combustion engine and a turbine driven by exhaust gases from the internal combustion engine passing through the turbine, comprising; a bypass passage around said turbine, a waste gate valve in said passage movable from a closed position in which exhaust gases pass through said turbine and an open position in which some of the gases bypass said turbine, a motor for moving said valve means between open and close positions including a housing, a movable wall connected to said waste gate valve and forming chambers in said housing at opposite sides of said wall, a conduit connecting one of said chambers to the intake manifold to move said waste gate valve to an open position in the presence of a positive pressure in said one chamber, a controller in said conduit, said controller being operative in response to a pressure at said intake manifold in excess of a predetermined absolute pressure to admit pressure to said one chamber to regulate said waste gate valve relative to a constant absolute pressure independently of ambient pressure.

14. The combination of claim 13 in which said controller comprises a bellows having a predetermined constant pressure in the interior of said bellows, the exterior of said bellows being exposed to pressure at said intake manifold of said internal combustion engine, and a valve movable by said bellows from a closed position to an open position in the presence of pressure at said intake manifold in excess of a predetermined force exerted by said bellows.

15. The combination of claim 14 and further comprising a spring disposed within said bellows to extend said bellows to a position closing said valve.

16. The combination of claim 13 and further comprising a passage communicating the other of said chambers in said housing to the intake side of said compressor to establish a subatmospheric pressure in said other chamber.

17. The combination of claim 16 and further comprising a restricted passage in said movable wall to permit limited fluid flow between said chambers.

18. The combination of claim 13 and further comprising a passage between said one chamber and said carburetor permitting fluid flow to said chamber but preventing fluid flow from said chamber.

* * * * *